(No Model.)

J. M. STEARNS, Jr.
CONDUCTOR.

No. 257,778. Patented May 9, 1882.

Attests
L. C. Matos
Jame. F. Donahue

Inventor
J. Milton Stearns Jr.
By his atty.

UNITED STATES PATENT OFFICE.

J. MILTON STEARNS, JR., OF BROOKLYN, ASSIGNOR, BY MESNE ASSIGNMENTS, TO THE NEW YORK TELEGRAPH COMPANY, OF NEW YORK, N. Y.

CONDUCTOR.

SPECIFICATION forming part of Letters Patent No. 257,778, dated May 9, 1882.

Application filed November 26, 1881. (No model.)

*To all whom it may concern:*

Be it known that I, J. MILTON STEARNS, Jr., of the city of Brooklyn, in the county of Kings and State of New York, have invented an Improvement in Underground Conductors, of which the following is a specification.

My invention relates to underground conductors for electricity, adapted to both telegraphy and telephony, but more particularly the latter; and it consists in bending a strip or sheet of metal back and forth upon itself longitudinally and inclosing within each bend of said sheet metal an insulated electrical conducting-wire, whereby each insulated conductor is partly inclosed within a metallic case which is connected with the ground. This conductor or cable may be inclosed within iron pipes or terra-cotta tubes; but in the former case the metal casing must be in connection with the ground at one or more places.

The object of my invention is to allow a number of electric wires to be laid under ground and close to each other and prevent induced currents being set up in other wires by an electrical current passing over any one or more wires.

Figure 1:
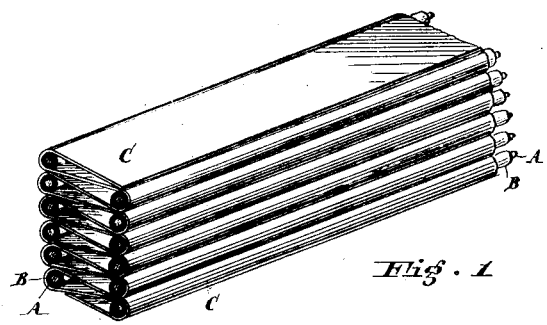
Figure 2:
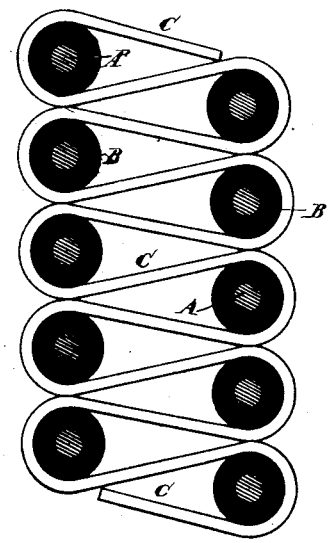

In the drawings, Figure 1 is a perspective view of a portion of a cable embodying in it my improvement, and Fig. 2 is a cross-section of the same enlarged.

A are the electrical wires. B is the insulating covering. C is the induction-case, and is made of thin sheet metal, preferably copper, doubled upon itself longitudinally, alternately in opposite directions, like the letter ≥ continued, and the insulated wires are laid in each of the bends, thereby being separated from each other by a thin sheet of metal, as well as their insulating coatings. This cable is then inclosed in an iron or lead or other metallic tube and placed in the ground; or it may be inclosed in any earthen tube or wooden trough; but in these cases the casing C must be connected to the earth in one or more places.

If a current is passing down one of the electric wires, it tends to produce induced currents in the other wires, and would do so if laid adjacent to one another; but in this construction any induced current is carried off by the casing C to the ground.

This cable is particularly adapted to telephonic purposes where induction effects are liable to prevent proper action of the receiving-telephone, and thereby mar the articulate speech.

I am aware of the patents to Ware and Sewall, respectively numbered 243,180 and 239,560, and do not claim anything therein shown or described.

Having now described my invention, what I claim as new, and desire to secure by Letters Patent, is—

An underground cable for telegraphic or telephonic purposes which consists of two or more wires, A, having insulating coatings B and induction-casing C, said insulated wires being arranged in the bends of the induction-casing and on alternately opposite sides of same, substantially as and for the purpose specified.

In testimony of which invention I hereunto set my hand.

J. MILTON STEARNS, JR.

Witnesses:
JOHN M. STEARNS,
GEO. W. GREEN.